June 25, 1935.  D. D. HERON ET AL  2,005,993

HOLDER FOR DENTAL X-RAY FILMS

Filed May 15, 1934

WITNESSES
B. Wallace
E. O. Johns

INVENTORS
Donald D. Heron
Robert S. Heron
By Brown, Critchlow & Flick
Attorneys.

Patented June 25, 1935

2,005,993

UNITED STATES PATENT OFFICE 2,005,993

HOLDER FOR DENTAL X-RAY FILMS

Donald D. Heron and Robert S. Heron, Pittsburgh, Pa.

Application May 15, 1934, Serial No. 725,678

10 Claims. (Cl. 250—34)

This invention relates to holders for dental X-ray films, and more particularly to holders for positioning films for the taking of radiographs of upper and lower teeth simultaneously on the same film.

Various types of film-holders have been used in connection with taking a radiograph of upper and lower teeth on the same film, but they all have disadvantages, such as being difficult to insert and position in the mouth, or disagreeable or painful to the patient. With substantially all prior types of holders the film is bowed in the mouth by being pulled up tight against the teeth and gums to assure its being directly behind the teeth being radiographed, thereby making it impossible to take an undistorted radiograph. Another disadvantage of such holders is that it is difficult to ascertain the position of the film in the mouth, especially when radiographing molar teeth, for the purpose of focusing X-ray apparatus on it.

It is among the objects of this invention to provide a holder for dental X-ray films by the use of which radiographs of upper and lower teeth can be made simultaneously on the same film, and by which films can be held adjacent either the front or back teeth without being distorted by the teeth or gums. Another object is to provide such a holder to which films of different sizes can be quickly attached. A further object is to provide a holder which can be placed in any desired position between the teeth without difficulty and without pain or discomfort to the patient. A still further object is to provide a film-holder which properly positions the film relative to the teeth being radiographed, and which visibly indicates the position of the film inside of the mouth so that X-ray apparatus can be properly focused on the film. Other objects are to produce a film-holder which is light in weight, compact and inexpensive.

Figure 1:
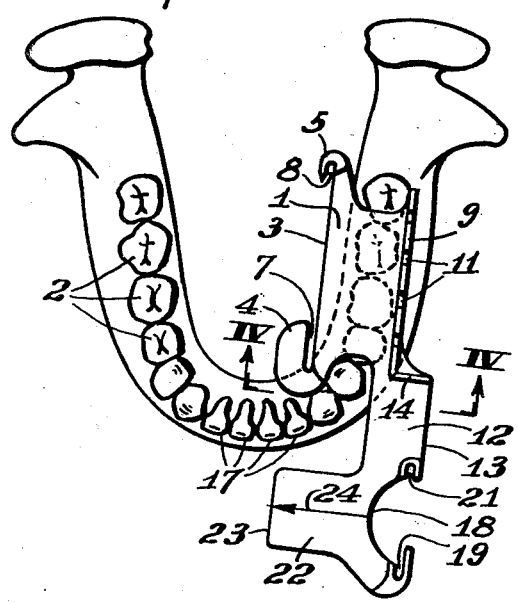
Figure 3:
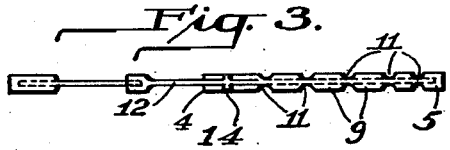
Figure 4:
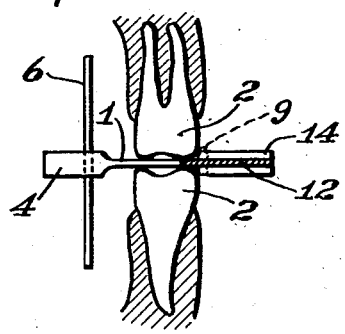
Figure 2:
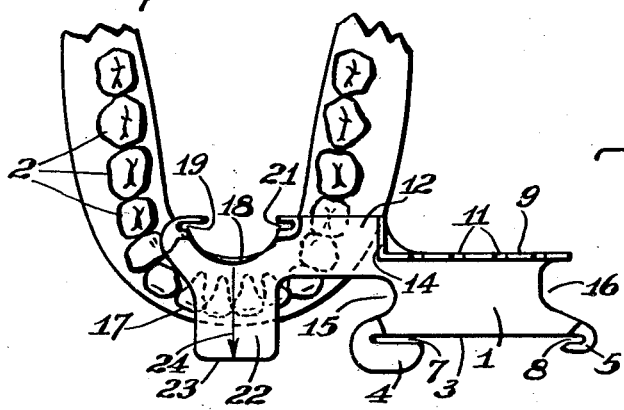
Figure 5:
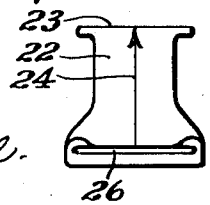
Figure 6:
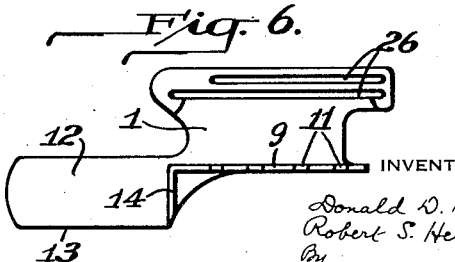

The invention is illustrated in the accompanying drawing, in which Fig. 1 is a plan view of the film-holder disposed on the lower molar teeth at one side of a human jaw; Fig. 2 a similar view but with the film-holder disposed on the incisors; Fig. 3 a side view of the holder; Fig. 4 a section taken on the line IV—IV of Fig. 1 and showing upper teeth biting on the holder in which an X-ray film is held; Figs. 5 and 6 plan views of modified forms of holders; and Fig. 7 an enlarged view of a modified form of film-retaining notch.

Referring to Figs. 1, 3 and 4 of the drawing, the film-holder includes a bite-piece 1 adapted to be gripped between the upper and lower back teeth or molars 2. This bite-piece is of generally rectangular shape, and is relatively thin and resilient so that when the teeth bite on it the upper and lower crowns are brought close together, it being apparent that the closer the teeth can be brought together the more of their area will show in a radiograph.

The bite-piece is provided at both ends of its inner edge 3 with laterally extending integral hook portions 4 and 5 which form film-retaining front and rear notches 7 and 8, respectively, for detachably holding an X-ray film 6 (Fig. 4) at right angles to the bite-piece. To attach a film to the holder, one end of it is first inserted in notch 7 which is relatively long to provide secure engagement of the holder with the film, and the other end is then snapped into the relatively shallow rear notch 8. The hook-forming portions of the bite-piece are thickened in order to bear against the film over a greater area for rigidly positioning it perpendicular to the bite-piece.

It is a feature of this invention that the opposite or outer edge of the bite-piece has a flange 9 extending transversely thereof and substantially parallel to inner edge 3. The flange is, therefore, parallel to the plane of a film held by film-retaining hooks 4 and 5, and preferably is provided with a series of notches 11 in order not to prevent bending of the bite-piece to conform to irregular teeth. As shown in Figs. 1 and 4, the width of the bite-piece is such that when it is gripped between the upper and lower back teeth with flange 9 in contact with the outer or buccal surfaces thereof, an X-ray film held against the inner edge of the bite-piece is, contrary to the usual practice, spaced from the inner surfaces of the teeth and gums to prevent it from being distorted by engagement therewith. In spite of film 6 being out of contact with the teeth and of being hidden from view behind them, the practitioner knows that the film is substantially parallel to the teeth because it is parallel to flange 9 which he placed in engagement with the teeth.

On account of the film held by bite-piece 1 being entirely out of sight in the mouth, and flange 9 being hidden by the cheek, it is desirable to provide means plainly visible from outside of the mouth for indicating the position of the film relative to the teeth so that X-ray apparatus can be properly focused upon it; otherwise, an incomplete or blurred radiograph is apt to be produced. Furthermore, unless the central rays from the X-ray apparatus are perpendicular to the plane of the film the resulting radiograph will show the teeth in overlapping relation, thereby making it difficult to diagnose the case. Therefore, in accordance with this invention, bite-piece 1 is provided with an indicator extension 12 integral with its forward end and lying in the same plane as the bite-piece (Figs. 1 and 3). The extension projects from the mouth with its outer edge 13 lying in a plane parallel to inner edge 3 of the bite-piece, whereby when X-ray apparatus is focused in the plane of the extension and at right angles to edge 13 it is necessarily focused perpendicular to the plane of the X-ray film inside the mouth.

In addition, it is also desirable to indicate to the practitioner the positions of the ends of the X-ray film in the mouth so that the radiograph will show all that he intends it should. Accordingly, as shown in Fig. 1, extension 12 is provided with indicating means, such as a rib 14, opposite the forward end of notch 7 for indicating the forward end of the film. Extension 12 is offset relative to bite-piece 1 in order to bring rib 14 outside of the mouth where it is visible to the practitioner who, knowing the approximate length of the film, is then able to center his X-ray apparatus relative to the film. The bite-piece is recessed between hook 4 and the extension, as at 15, to prevent it from extending between the canine teeth, which generally are longer than the molars, and thereby interfering with closing of the jaws. The bite-piece is also preferably recessed between hook 5 and the rear end of flange 9, as at 16, to give greater comfort to the patient.

Indicator extension 12 also serves as a handle for inserting bite-piece 1 between the teeth without requiring the practitioner to grope around in the patient's mouth with his fingers to manipulate an X-ray film into place. Furthermore, as bite-piece 1 is too long to hold X-ray films in the jaw curve behind the front teeth 17 for taking radiographs thereof, the outer portion of the handle or indicator extension 12 is used for that purpose. Accordingly, as shown in Figs. 1 and 2, an end portion of the extension adjoining outer edge 13 is provided with an arcuate recess 18 having oppositely-disposed film-retaining notches 19 and 21 near the opposite ends of its wall. The distance between these notches is considerably shorter than the distance between notches 7 and 8 because X-ray films held by the extension must be short enough to fit in the arch at the front of the jaws. An X-ray film is inserted in notches 19 and 21 by slipping one end of the film into notch 19 which is relatively long to provide secure engagement of the holder with the film, and then bending the film back into recess 18 until its opposite end snaps into notch 21. The portions of the extension immediately surrounding notches 19 and 21 are thickened in order to bear against the film over a substantial area for rigidly positioning it perpendicular to the holder.

The opposite side of extension 12 is provided with an integral and laterally-extending flat bite-piece 22 of generally rectangular shape. This bite-piece is thin, for the same reason as bite-piece 1, and its length is such that when it is gripped between the upper and lower front teeth with its associated X-ray film spaced far enough away from the teeth and gums to avoid distortion, the bite-piece projects from the mouth. Bite-piece 22 is narrow enough to rest on the incisors between the canine teeth so that the latter will not interfere with closing of the jaws. Flange 9, being offset relative to edge 13 of extension 12, does not interfere with the cheek when radiographing front teeth.

The front or outer edge 23 of this bite-piece is parallel to a film disposed in notches 19 and 21, and this edge together with the main plane of the bite-piece, which is perpendicular to the film, are means for determining the proper angle at which the X-ray apparatus should be set and focused. Any suitable indicating means, such as a line 24, perpendicular to the film midway between its ends serves to show the location of the center of the film behind the teeth. Bite-piece 22 is also suitable for use in connection with radiographing the canine teeth by merely inserting the bite-piece between the crowns of those teeth.

It will be apparent from this construction that a one-piece holder for dental X-ray films is provided which is adapted to be used with front or back teeth, and in which each bite-piece and its immediately adjoining portions serve as a handle for the other bite-piece when placing an X-ray film in position behind the teeth. However, if desired, the holder can be made in two parts, as shown in Figs. 5 and 6, with the indicator extension 12 alone serving as the handle for the larger bite-piece, and the front portion of the smaller bite-piece 22 itself serving as the handle for that bite-piece.

Figs. 5 and 6 illustrate other modifications that also can be incorporated in the one-piece holder previously described. For instance, instead of film-retaining notches, each bite-piece can be provided adjacent its inner edge with one or more film-retaining slots 26. When a plurality of slots is provided they are of different lengths for the purpose of holding X-ray films of different lengths, the shorter films being especially suitable for radiographing children's teeth. Like the one-piece holder, the portion of each bite-piece adjoining the film-retaining slot or slots is thickened for more rigid positioning of the films. Also, as shown in Fig. 5, the outermost portion of bite-piece 22 may be widened to give to outer edge 23 the same length as slot 26, whereby edge 23 indicates both the plane of a film held in the slot and its length.

Figure 7:
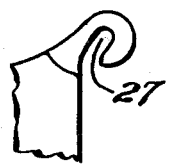

In Fig. 7 a modified form of film-retaining notch 27 is shown which can be used in place of notches 8 and 21. Notch 27 is curved away from the film-engaging edge of the bite-piece in order to bend the portion of a film in the notch for the purpose of more securely holding the film in place. Other types of notches or film-retaining devices could also be used.

The X-ray film-holder disclosed and described herein can also be used to advantage in radiographing the root ends of the teeth of either jaw. In such a case the X-ray film is held in the film-retaining notches or slots adjacent either its upper or lower edge, as required. In radiographing the upper molar teeth root ends in this manner the shadow of the malar bone, which would ordinarily be superimposed upon the roots, does not strike the film because the film, being spaced from the teeth, is held in a substantially vertical plane which permits the X-ray apparatus to be focused thereon sufficiently below the malar bone to avoid the shadow.

A dental film-holder made in accordance with this invention is simple in construction, compact and light, but at the same time highly efficient and useful in radiographing either front or back teeth. Being thin and preferably resilient, teeth of the upper and lower jaws are brought close together in biting on it so that a substantial portion of their area can be radiographed on a single film. Furthermore, the holder is formed for positively positioning X-ray films a sufficient distance behind the teeth to permit the films to lie in a substantially vertical plane in the mouth, whereby X-ray apparatus is focused on a flat instead of on a curved surface and the resulting radiographs are undistorted.

Other important advantages of this holder are that it is so formed as to indicate outside of the mouth the plane and the positions of the ends of an X-ray film hidden behind the teeth so that the central rays of X-ray apparatus can be focused perpendicular to the center of the film. This gives a complete radiograph of the desired teeth and shows the spaces between them rather than showing them in overlapping relation. Still further advantages of this holder are the comfort to the patient and the ease of operation over previous methods.

According to the provisions of the patent statutes, we have explained the principle and operation of our invention, and have illustrated and described what we now consider to represent its best embodiment. However, we desire to have it understood that, within the scope of the appended claims the invention may be practiced otherwise than as specifically illustrated and described.

We claim:

1. A holder for dental X-ray films, comprising a relatively thin bite-piece adapted to be gripped between upper and lower back teeth and formed adjacent one edge with an opening for receiving and holding an X-ray film substantially at right angles to itself, the opposite edge of the bite-piece being provided with a flange substantially parallel to the plane of the film, the width of the bite-piece being such that when said flange is placed in contact with the buccal surfaces of said teeth the film is spaced from those teeth whereby distortion of the film by contact with the teeth and gums is substantially eliminated.

2. A holder for dental X-ray films, comprising a relatively thin bite-piece adapted to be gripped between upper and lower back teeth and formed adjacent one edge for holding an X-ray film substantially at right angles to itself, the opposite edge of the bite-piece being provided with a flange substantially parallel to the plane of the film, the width of the bite-piece being such that when said flange is placed in contact with the buccal surfaces of said teeth the film is spaced from those teeth whereby distortion of the film by contact with the teeth and gums is substantially eliminated, one end of the bite-piece being provided with an extension adapted to project from the mouth and having an edge parallel to the plane of the film, whereby the plane of the film in the mouth is indicated outside of the mouth so that X-ray apparatus can be properly focused on said film.

3. A holder for dental X-ray films, comprising a bite-piece adapted to be gripped between upper and lower back teeth and formed adjacent one edge for holding an X-ray film substantially at right angles to itself, the opposite edge of the bite-piece being provided with a flange substantially parallel to the plane of the film, the width of the bite-piece being such that when said flange is placed in contact with the buccal surfaces of said teeth the film is spaced from those teeth whereby the film is not distorted, the forward end of the bite-piece being provided with an extension adapted to project from the mouth and having an edge lying in a plane parallel to the plane of the film, and said extension having means for also indicating the position of the forward end of the film, whereby X-ray apparatus can be properly focused on the film.

4. A holder for dental X-ray films, comprising a bite-piece adapted to be gripped between upper and lower back teeth and provided adjacent one longitudinal edge with a plurality of film-receiving slots of various lengths for receiving X-ray films of various lengths, and one end of the bite-piece being provided with an extension adapted to project from the mouth and having an edge parallel to the plane of the film, whereby the plane of the film is visibly indicated so that X-ray apparatus can be properly focused on said film.

5. A holder for dental X-ray films, comprising a relatively thin and flexible bite-piece adapted to be gripped between upper and lower back teeth and having a thickened portion extending longitudinally of one side of itself, said thickened portion being provided with a plurality of parallel film-receiving longitudinal slots of various lengths for receiving X-ray films of various lengths, and one end of the bite-piece being provided with an extension adapted to project from the mouth and having an edge parallel to the plane of the film, whereby the plane of the film is visibly indicated so that X-ray apparatus can be properly focused on said film.

6. A one piece holder for dental X-ray films, comprising a bite-piece adapted to be gripped between upper and lower back teeth and formed for holding an X-ray film substantially at right angles to itself, said bite-piece being provided at its front end with a substantially flat integral extension projecting forwardly of the film and lying in the plane of the bite-piece, and said extension being adapted to project forwardly from the mouth and having its outside edge parallel to the plane of the film, whereby the plane of the film in the mouth is indicated outside of the mouth so that X-ray apparatus can be properly focused on said film.

7. A holder for dental X-ray films, comprising a bite-piece adapted to be gripped between upper and lower back teeth and formed for holding an X-ray film substantially at right angles to itself, said bite-piece being provided at the end thereof corresponding to the front end of the film with an integral extension the longitudinal axis of which lies in a plane substantially parallel to the plane of the film, said extension projecting forwardly of the film and being adapted to project forwardly from the mouth and having an edge parallel to the plane of the film, and said extension having means in alignment with the forward end of the film for indicating the position of said end of the film, whereby the plane and the position of the film in the mouth is indicated outside of the mouth so that X-ray apparatus can be properly focused on said film.

8. A holder for dental X-ray films, comprising a bite-piece adapted to be gripped between upper and lower back teeth and provided at opposite ends of one longitudinal edge with outwardly extending hook portions, said hooks being formed for detachably holding an X-ray film against said edge, said bite-piece being provided at its front end with an integral extension the longitudinal axis of which lies in a plane substantially parallel to the plane of the film, said extension projecting forwardly of the film and being adapted to project forwardly from the mouth and having an edge parallel to the plane of the film, whereby the plane of the film is visibly indicated so that X-ray apparatus can be properly focused on said film.

9. A holder for dental X-ray films, comprising a relatively thin and flexible bite-piece adapted to be gripped between upper and lower back teeth and provided at opposite ends of one longitudinal edge with outwardly extending hook portions, said hook portions being adapted to detachably hold an X-ray film against said edge and being thicker than the remainder of the bite-piece in order to maintain the film substantially perpendicular to the plane of the bite-piece, said bite-piece being provided at its front end with an integral extension the longitudinal axis of which lies in a plane substantially parallel to the plane of the film, said extension projecting forwardly of the film and being adapted to project forwardly from the mouth and having an edge parallel to the plane of the film, whereby the plane of the film is visibly indicated so that X-ray apparatus can be properly focused on said film.

10. A holder for dental X-ray films, comprising a bite-piece adapted to be gripped between upper and lower back teeth and formed for holding an X-ray film substantially at right angles to itself, said bite-piece being provided at its front end with an integral extension the longitudinal axis of which lies in a plane substantially parallel to the plane of the film, said extension projecting forwardly of the film and being adapted to project forwardly from the mouth and having an edge parallel to the plane of the film, and said extension having means in alignment with the forward end of the film for indicating the position of said end of the film and being offset relative to the bite-piece to bring said end-indicating means into view outside of the mouth, whereby the plane and the position of the film in the mouth is visibly indicated so that X-ray apparatus can be properly focused on said film.

DONALD D. HERON.
ROBERT S. HERON.